Jan. 10, 1961 R. J. FROGGATT 2,968,026

STORES, ESPECIALLY FOR DIGITAL COMPUTERS

Filed April 5, 1957

Inventor
R. J. Froggatt
By Mason, Downing & Seebold
Attys.

2,968,026
Patented Jan. 10, 1961

2,968,026

STORES, ESPECIALLY FOR DIGITAL COMPUTERS

Robert Justin Froggatt, Norwood Green, Southall, England, assignor to Electric & Musical Industries Limited, Hayes, England, a company of Great Britain Filed Apr. 5, 1957, Ser. No. 650,960

Claims priority, application Great Britain Apr. 7, 1956

5 Claims. (Cl. 340—172.5)

Figures 1, 3:
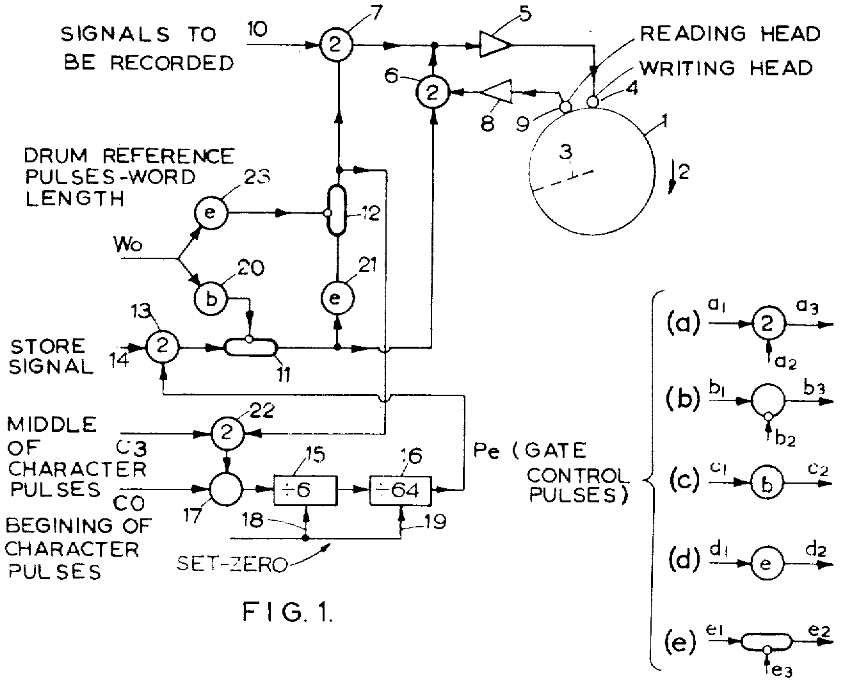

This invention relates to storage arrangements for electrical signals. The invention relates especially to storage arrangements for use in digital computers, such as are used for example in data handling apparatus.

Data handling apparatus is now often used in commerce to handle booking or clerical problems involving computation. One form of such apparatus is described in United States copending patent application Serial No. 561,629 and in this apparatus the need arises for buffer stores in which information is recorded at random times and from which the stored information is subsequently derived for processing in the apparatus. The time at which the information is derived from the buffer store may therefore be unrelated to the time of recording the information. Moreover if the information is entered in the machine by means of an electric typewriter, such as a teleprinter, the information tends to be entered irregularly and in bursts of several characters. Moreover assuming a digital pulse code is employed for the information each character may comprise a group of, say six, digital code elements. Therefore, when it is required to record an item of information of the buffer store, a problem arises on determining the correct positions at which entries should be made so that they shall follow successively on previously recorded information. A similar problem arises when it is desired to derive information from the store, namely that of determining the starting position in the store of the information required.

With the apparatus described in the aforesaid copending patent application the buffer stores are in the form of tracks on magnetic drums and it is feasible to determine the position of an item of information in such a store by providing two counters. The count registered by one counter is arranged to advance in unit steps as successive positions, say word positions, pass the reading or writing head used for recording information on or deriving information from the drum. The other counter is caused to advance one as each item of information is recorded, and the position for reading or writing the next item can then be determined by comparing the counts registered in the two counters until coincidence is established. This proposal however involves means for comparing all stages of the counters and may involve considerable complexity of equipment.

The problem described above in relation to apparatus of the kind described in United States co-pending patent application Serial Number 561,629 may of course arise in other forms of data handling apparatus and the object of the present invention is to reduce this problem.

According to the present invention there is provided a storage arrangement, especially for electrical data handling apparatus, comprising a circulating store having an input point and an output point, a signal path including a normally closed gate connected to one of said points, means for opening said gate at predetermined times in relation to cycles of said store to allow transfer of signals to or from the respective point, and means for interconnecting said points after an opening of said gate to shift signals recorded in the store so that a series of signals can be recorded or reproduced (as the case may be) by opening said gate at successive times similarly related to respective cycles of the store.

The expression "circulating store" used herein and in the claims means a store in which successive storage positions circulate with respect to an input or output path by virtue of relative displacement between the storage positions and the path, so that each storage position is accessible for the transfer of information to or from the path only once in a cycle of the store.

In order that the invention may be clearly understood and readily carried into effect, the invention will be described with reference to the accompanying drawings, in which:

Figure 1 illustrates diagrammatically one form of buffer storage arrangement in accordance with the present invention especially intended for use in data handling apparatus such as described in the aforesaid co-pending patent application.

Figure 2:
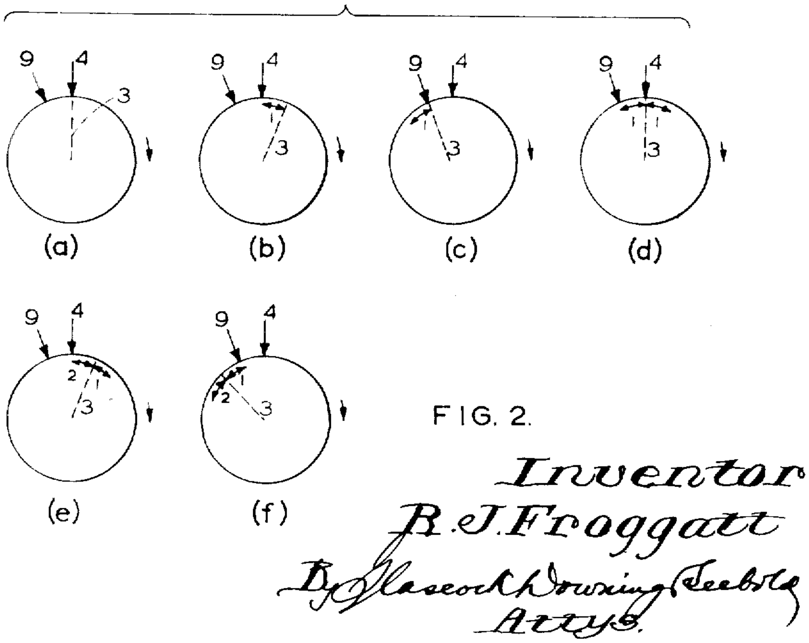

Figure 2 comprises diagrams explanatory of the operation of Figure 1, and

Figure 3 illustrates symbols used in the drawings to represent conventional circuit units, in order to simplify the drawings and to facilitate description thereof.

Referring first to Figure 3, the symbol (*a*) represents a pulse gate having input connections $a_1$ and $a_2$ and an output connection $a_3$. The figure enclosed in the symbol denotes the threshold of the gate, the figure being 2 in the example illustrated, thereby indicating that it would require the simultaneous application of pulses of standard amplitude to two input connections to produce the single output pulse. A suitable form of pulse gate is described in the "proceedings of the I.R.E.," May 1950, page 511.

Symbol (*b*) denotes a pulse inhibitor gate having a normal input connection $b_1$, an inhibit input connection $b_2$ and an output connection $b_3$. A pulse applied to $b_2$ inhibits the transmission of pulses from $b_1$ to $b_3$. However a voltage representing a zero digit on $b_1$ permits the transmission of a pulse from $b_1$ to $b_3$. A pulse inhibitor gate may be of similar construction to a pulse gate such as represented by symbol (*a*), with, however, one of the controls reversed.

Symbol (*c*) denotes a beginning element which produces a short pulse on an output connection $c_2$ at the beginning of a pulse applied to an input connection $c_1$. A beginning element may consist of a differentiating circuit followed by a limiter to remove the short pulse corresponding to the end of the applied pulse and produced on differentiating the applied pulse.

Symbol (*d*) denotes an end element which produces a short pulse on an output connection $d_2$ at the end of a pulse applied to an input connection $d_1$. The end element may consist of a differentiating circuit followed by a limiter to remove the short pulse corresponding to the beginning of an applied pulse and produced on differentiating the applied pulse.

Symbol (*e*) denotes a two-stage device having an input connection $e_1$, an output connection $e_2$ and an inhibitor connection $e_3$. When the device is in one stage, state "0," a signal on the connection $e_1$ changes the device to the state "1," the device remaining in that state until a signal is applied to the inhibitor connection $e_3$, whereupon the device reverts to the state "0." In state "1" of the device, the output connection $e_2$ is energised. A two-state device such as indicated by symbol (*e*) can be realised, for example, by means of an Eccles-Jordan circuit, or by an equivalent circuit using transistors.

As aforesaid, the storage arrangement about to be described is intended to form part of data handling apparatus and it will be assumed that information circulating in the apparatus is in the form of electrical pulses coded in a binary decimal pulse code. So that both numbers and alphabetic letters may be encoded, six digital places are allotted to each character, and six characters are termed a "word." Furthermore, the arrangement to be described incorporates a magnetic drum, and the description will be confined to a single track around the periphery of the drum, although it will be appreciated that there may be many such tracks spaced from each other in the direction of the drum axis. It will be assumed that sixty four words may be recorded on each such peripheral track and also that the code signals used are of such a kind that over-printing previously recorded signals on the track has the effect of cancelling the previous signals and establishing the new signals. For example code signals of the kind described in British patent specification No. 707,634 may be used.

The drum employed in the arrangement is illustrated in Figure 1 in plan view and indicated by the reference 1 and, in operation of the store, the drum is rotated at a predetermined speed in the direction denoted by the arrow 2. For example the drum may be driven by a synchronous motor suitably synchronised with the digit times of the apparatus by known techniques, as by the aid of timing pulses recorded on a special track on the drum. It will be assumed that a basic timing pulse *Wo*, is available in the apparatus, once during each revolution of the drum, the basic timing pulses being arranged to occur at a predetermined bearing of the drum. In the present case, the pulse *Wo* is arranged to occur each time the radius indicated by the dotted line 3 in Figures 1 and 2 is aligned with a writing head 4 applied to the track on the drum under consideration. Figure 2 illustrates a series of bearings of the drum 1. It is also assumed that the speed of rotation of the drum is such that the time of one revolution is short compared with the time which would normally be taken to enter a character by way of an electric typewriter. Nevertheless as explained in the aforesaid co-pending application, pulse code signals when passed into circulation in the apparatus are synchronised by a clock in such a way that the digital code elements occur in a predetermined regular time sequence. The aforesaid pulses *Wo* each have a duration of one word interval (i.e. six character times), and in addition to the *Wo* pulses, it will be assumed that there are available other timing pulses denoted by *Co* and C3 respectively. These pulses may be derived from the control mechanism of the apparatus, in which the store is incorporated, in well known manner. The pulse *Co* occurs at the start of each character interval whilst the pulse C3 occurs at the middle of each character interval that is at the time of the fourth digit.

The writing head 4 is fed by an amplifier 5 which can receive signals either by way of a threshold-two gate 6 or a similar gate 7. The gate 6 receives one input from an amplifier 8 which is arranged to amplify signals derived from a reading head 9 applied to the same track on the drum 1 as the writing head 4. The head 9 is positioned one word space in advance of the head 4. The threshold-two gate 7, on the other hand, receives one input from a highway 10 on which will occur, from time to time, signals to be recorded on the drum 1. A second input to the gate 6 is derived from a two-state device 11 and a second input to the gate 7 is derived from a two-state device 12. Both devices 11 and 12 are normally in state "0" but when it is desired to record a word on the drum 1, a "store" signal is applied to one input of a threshold-two gate 13 by a lead 14 this "store" signal being in the form of a D.C. bias or long pulse starting at the same time as a *Wo* pulse and lasting for nearly the time of one revolution of the drum 1. The "store" signal is in fact an "access-demanding" signal since it is indicative of a demand for access to the drum 1. The gate 13 receives a second input from a dividing circuit represented in the drawing as comprising two stages 15 and 16 which respectively divide by 6 and 64. The dividing circuit receives *Co* pulses (that is one pulse per character interval) through a threshold-one gate 17. The dividing circuit 15, 16 therefore delivers an output pulse once per revolution of the drum 1 and the stages of the dividing circuit have zero-setting connections 18 and 19 such that when initiating operation of the machine it can be arranged that the output pulses of the divider 15 and 16, which may be referred to as *Pe* pulses, coincide with the start of the *Wo* pulses. However, the *Pe* pulses are arranged to have a duration of only one digit interval.

With this arrangement, when the "store" signal is applied to the input lead 14, a *Pe* pulse always occurs before the store signal ceases (unless the store is full). Assume initially that the *Pe* pulses coincide with the beginnings of *Wo* pulses. This situation which is represented in Figure 2*a* indicates that no word is recorded on the respective track of the drum 1. The *Pe* pulse occurring during the "store" signal causes the two-state device 11 to be changed to state "1." This would normally apply a conditioned signal to the threshold-two gate 6 but in the circumstance envisaged, the two-state device 11 is immediately restored to state "0" by the output from a beginning element 20 to which *Wo* pulses are applied. To ensure correct timing, the *Pe* pulse may be arranged to precede the *Wo* pulse by a small interval. Alternatively the first word recorded in any track may be a dummy word. When in response to the output from the beginning element 20, the two-state device 11 reverts to state "0," an end element 21 applies a triggering pulse to the two-state device 12 and changes the latter to state "1." This in turn causes a conditioning signal to be applied to the threshold-two gate 7 and to another threshold-two gate 22. The word to be recorded can then be transferred from the highway 10, through the gate 2 and the amplifier 5, to the writing head 4 causing the word to be recorded on the drum in the first word space following the radius 3, as shown in Figure 2*b*. While the word is being recorded, C3 pulses are able to pass through the gate 22 and the gate 17 to the dividing circuit 15 and 16, so that extra pulses are fed to the dividing circuit. When the *Wo* pulse under consideration ends, it is effective through the intermediary of an end element 23 to restore the two-state device 12 to state "0." This prevents further signals being transmitted through the gates 7 and 22. It will be appreciated that six extra pulses are fed to the dividing circuit 15 and 16 through the gates 22 and 17 and they cause the succeeding *Pe* pulses to start one word time before the radius 3 on the drum 1 passes the writing head 4.

Assume that at some subsequent time it is desired to record a further word on the drum. The "store" signal is again applied to the lead 14 and the two-state device 11 is then changed to state "1" on the occurrence of the next *Pe* pulse. This takes place when radius 3 in the drum passes under the reading head 9, as shown in Figure 2(*c*). The action of this *Pe* pulse is now not immediately counteracted by a pulse *Wo* and consequently the gate 6 is conditioned to transfer word "1" from the reading head through the amplifiers 8 and 5 to the writing head 4. This has the effect of shifting word "1" forward on the track of the drum by one word space as represented in Figure 2(*d*). When this forward shift has been completed, radius 3 passes under the writing head 4 and a *Wo* pulse begins. The two-state device 11 is changed to state "0" and the output of the end element 21 then causes two-state device 12 to change to state "1," conditioning the gate 7 to allow the next word to pass to the writing head 4. Consequently word "2" is over-printed on the word space originally occupied by word "1," as represented in Figure 2(*e*). During this printing process, C3 pulses are supplied to the dividing circuit through the gate 22 and cause subsequent *Pe* pulses to occur two word-intervals prior to the passage of radius 3 on the drum under the writing head 4. As further words are recorded on the drum 1, it will be understood that the foregoing procedure is repeated and causes the recorded words to be shifted forward each time so that the new word can be recorded in the word space immediately following the radius 3 on the drum. Consequently correct arrangement of the words recorded in the drum is ensured by virtue of the fact that each new word which is recorded is located at a position determined by the basic timing pulses *Wo*. The situation when word "3" is about to be recorded is indicated in Figure 2(*f*).

It will be appreciated that the invention can be applied also to arrangements for deriving recorded information from a store. In this case however, it may be desired to derive the information in single characters, and then it is necessary to modify the spacing between the reading and writing heads to that of one character space. Modification of the control circuit is also necessary to arrange that when a first character reaches the reading head 9, it is picked off and passed to the utilisation circuit (which may be a printing device) and that when the reading of one character had been completed, the reading head is then connected to the writing head through the gate corresponding to 6 in Figure 1, whereupon all subsequent characters are shifted forward by a distance of one character space. The first remaining character (which will of course over-print the previous first character) then occupies the same position as the previous first character. Consequently the characters can be read off in the correct order although the reading of successive characters is initiated at corresponding times in successive cycles of the drum. In this form of the invention the *Pe* pulses or other corresponding pulses can be arranged to mark the end of the recorded information and will advance by on character interval (with reference to the *Wo* pulses) each time a character is read from the drum. The reading circuit may of course be arranged to read a word or more at a time instead of a single character if desired, in which case the separation of the heads 9 and 4 would be adjusted appropriately.

However where the circuit for recording information on the store is of the construction shown in Figure 1, it is preferred to employ a reproducing circuit of the construction which is described in the specification of copending patent application Serial No. 650,959, filed April 5, 1957. In this case the counting circuit 15, 16 may be common to the reading and writing circuits.

What I claim is:

1. A storage arrangement, especially for electrical data handling apparatus, comprising a circulating store having an input signal transducer and an output signal transducer, an information signal path including a normally closed gate connected to one of said transducers, a source of access demanding signals means responsive to an access demanding signal for opening said gate at predetermined times in relation to cycles of said store to allow transfer of signals through the respective path, means for generating marking signals timed in relation to cycles of said store, means for altering the timing of said marking signals in response to opening of said gate to cause said marking signals to indicate the location of signals recorded in the store, and means responsive to an access demanding signal for interconnecting said transducers at times determined by said marking signals to shift signals recorded in the store before the opening of said gate to allow the transfer of signals, so that successive signals can be recorded or reproduced by opening said gate at successive times similarly related to respective cycles of the store whilst the timing of the marking signals is altered to indicate the extremity of said series of signals.

2. A storage arrangement according to claim 1 wherein said circulating store comprises a magnetic record medium and transducing heads at said input and output points, mounted for movement relative to each other to cause the heads to traverse the record medium cyclically.

3. A storage arrangement according to claim 1 wherein the means for opening said gate is responsive to reference pulses which occur a fixed time in each cycle of said store, means being provided for inhibiting said gate-opening means when said reference pulses coincide with said marking pulses.

4. A storage arrangement, especially for electrical data handling apparatus, comprising a circulating store having an input signal transducer and an output signal transducer spaced from each other in the direction of circulation in said store, an information signal path including a normally closed gate connected to said input signal transducer, a source of access demanding signals means responsive to an access demanding signal for opening said gate at predetermined fixed times in relation to cycles of said store to allow the transfer of said signals to an input signal transducer, means for generating marking signals timed in relation to cycles of said store, means for altering the timing of said marking signals in response to opening of said gate to cause said marking signals to indicate the beginning of signals recorded in said store, and means responsive to an access demanding signal for interconnecting said transducers at times determined by said marking signals to shift signals recorded in said store before the opening of said gate to allow the transfer of signals so that successive signals can be recorded by opening said gate at successive times similarly related to respective cycles of said store whilst the timing of the marking signals is altered to indicate the beginning of said series of signals.

5. A storage arrangement according to claim 1 wherein said pulses generating means comprises a frequency dividing circuit, and means for applying synchronizing pulses to said frequency dividing circuit, said means for altering the timing of said pulses comprising means for applying additional pulses to said frequency dividing circuit to disturb the rhythm thereof, in response to opening of said gate.

References Cited in the file of this patent

UNITED STATES PATENTS

| | | |
|---|---|---|
| 2,698,427 | Steele | Dec. 28, 1954 |
| 2,739,299 | Burkhart | Mar. 20, 1956 |
| 2,759,171 | Fleming | Aug. 14, 1956 |